United States Patent [19]

DeSantis et al.

[11] 4,427,352
[45] Jan. 24, 1984

[54] MOUNTING STRUCTURE FOR DIE, PUNCH AND CORE ROD ASSEMBLY FOR COMPACTING POWDER MATERIAL

[75] Inventors: Raymond P. DeSantis, Troy; Herbert J. Puffer, Jr., Garden City, both of Mich.

[73] Assignee: PTX-Pentronix, Inc., Lincoln Park, Mich.

[21] Appl. No.: 419,815

[22] Filed: Sep. 20, 1982

Related U.S. Application Data

[63] Continuation-in-part of Ser. No. 351,482, Feb. 23, 1982, Pat. No. 4,390,335.

[51] Int. Cl.³ ..................... B30B 11/02; B30B 15/02
[52] U.S. Cl. ..................................... 425/78; 425/352;
425/406; 425/451.2; 249/160; 249/205;
403/262; 403/320; 411/393; 411/292
[58] Field of Search ............... 425/78, 352, 354, 355,
425/192, 77, 451.2, 590, 406, DIG. 223;
403/362, 320; 249/160, 205, 142, 144, 67, 68,
163; 411/393

[56] References Cited

U.S. PATENT DOCUMENTS

| | | | |
|---|---|---|---|
| 1,541,357 | 6/1925 | Johnson | 425/352 |
| 1,861,506 | 6/1932 | Nelson | 411/392 |
| 2,338,491 | 1/1944 | Cutler | 425/78 |
| 2,640,325 | 6/1953 | Haller | 425/78 |
| 3,132,379 | 5/1964 | Crane | 425/78 |
| 3,191,232 | 6/1965 | Haller | 425/78 |
| 3,328,842 | 7/1967 | Vnison | 425/78 |
| 3,344,213 | 9/1967 | Vinson | 264/39 |
| 3,345,691 | 10/1967 | Aoki | 425/451.2 |
| 3,414,940 | 12/1968 | Vinson | 425/78 |
| 3,561,054 | 2/1971 | Smith | 425/78 |
| 3,561,056 | 2/1971 | Smith | 425/78 |
| 3,574,892 | 4/1971 | Smith | 425/78 |
| 3,593,366 | 7/1971 | Smith | 425/78 |
| 3,621,534 | 11/1971 | Detroyer | 425/193 |
| 3,640,654 | 2/1972 | Smth | 425/78 |
| 3,664,784 | 5/1972 | Sibley | 425/78 |
| 3,669,582 | 6/1972 | Smith | 425/78 |
| 3,671,157 | 6/1972 | Smith | 425/78 |
| 3,677,673 | 7/1972 | Shapiro | 425/78 |
| 3,687,588 | 8/1972 | Smith | 425/78 |
| 3,726,622 | 4/1973 | De Troyer | 425/78 |
| 3,741,697 | 6/1973 | Smith | 425/78 |
| 3,775,032 | 11/1973 | Smith | 425/78 |
| 3,805,370 | 4/1974 | De Troyer | 425/78 |
| 3,822,974 | 7/1974 | DeSantis | 425/78 |
| 4,017,236 | 4/1977 | Penkman | 425/451.2 |
| 4,053,267 | 10/1977 | DeSantis | 425/78 |
| 4,153,399 | 5/1979 | DeSantis | 425/78 |
| 4,347,051 | 8/1982 | Desantis | 425/78 |

Primary Examiner—Donald E. Czaja
Assistant Examiner—Joel S. Baden
Attorney, Agent, or Firm—Hauke and Patalidis

[57] ABSTRACT

In a die, punch and core rod assembly for a powder compacting press wherein the core rod or rods remain stationary while the punch or punches are reciprocable relative to the die, the invention provides individual longitudinal position adjustment for the core rods by fitting the end of the core rods in a threaded member such as a set screw threading in a threaded bore in a core rod support member. The core rod support member is in the form of a pair of plates one defining a core rod support plate and the other a retainer plate, sandwiching a plastic locking plate. The core rods are immobilized in their adjusted position by the plastic locking plate, sandwiched between the core rod support plate and the retainer plate, being provided with a threaded bore aligned with the threaded bore in the support plate and having a slight screwthread mismatch with the threaded bore in the support plate.

14 Claims, 9 Drawing Figures

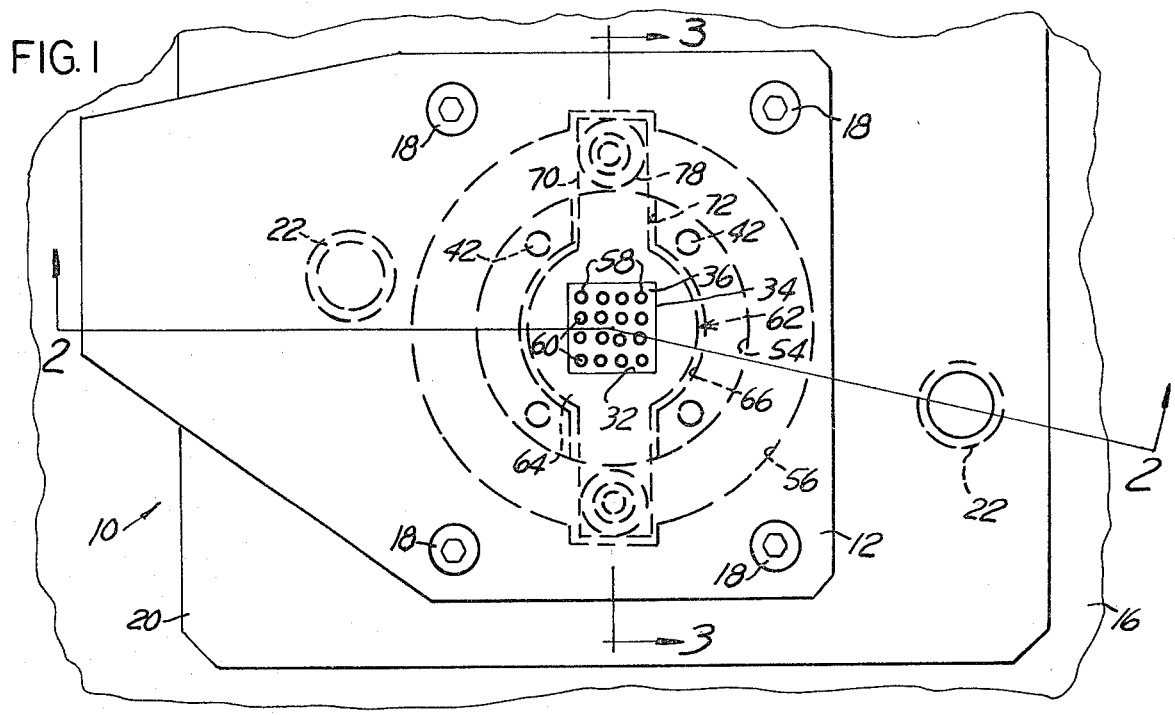

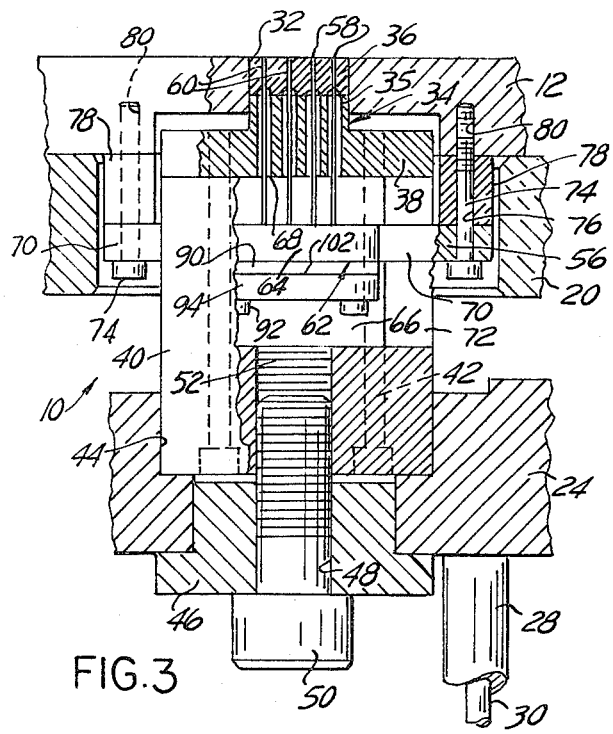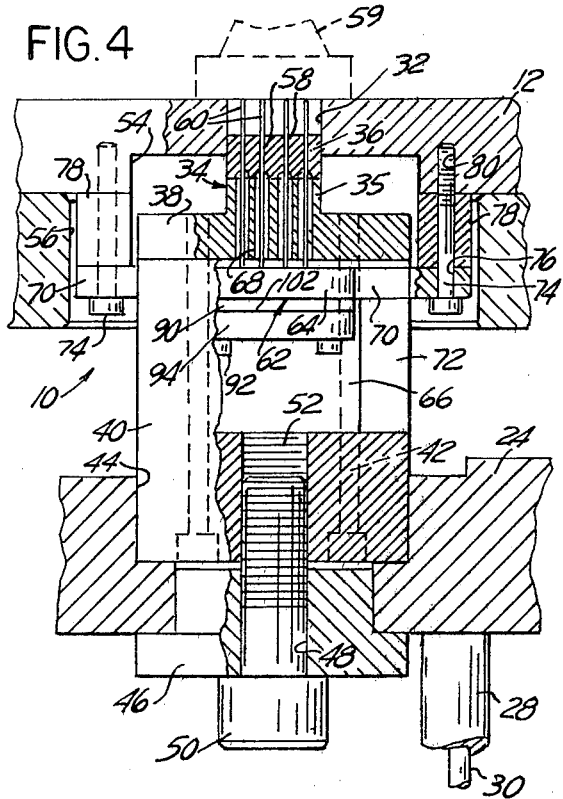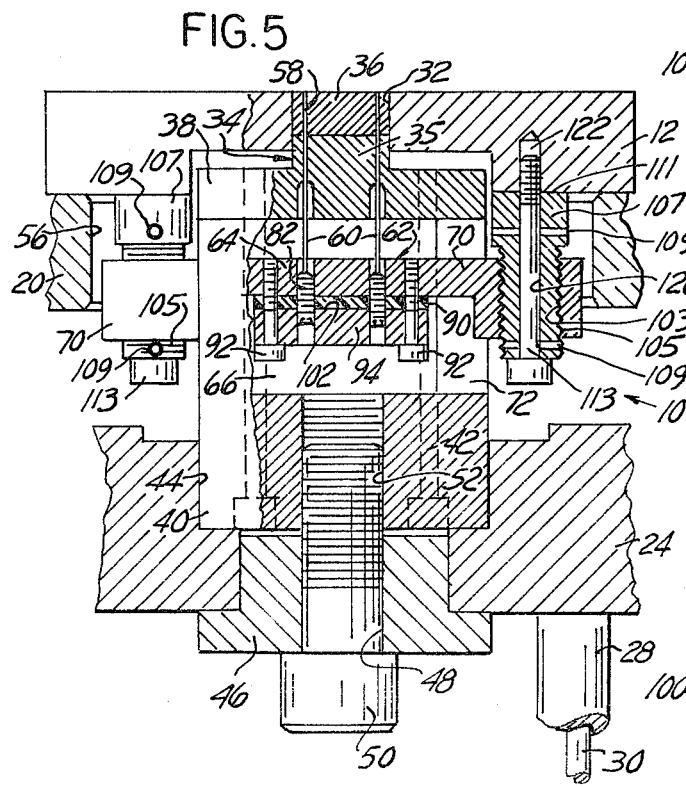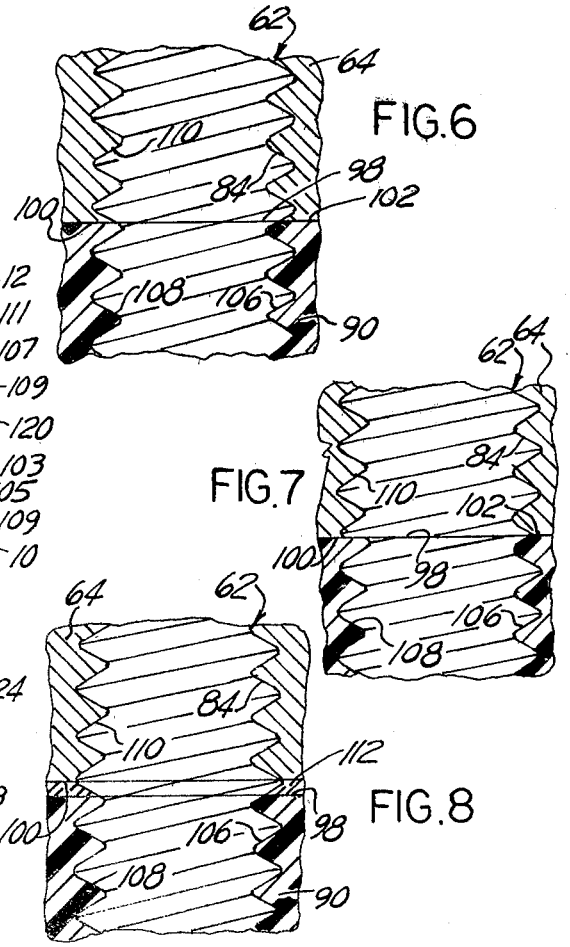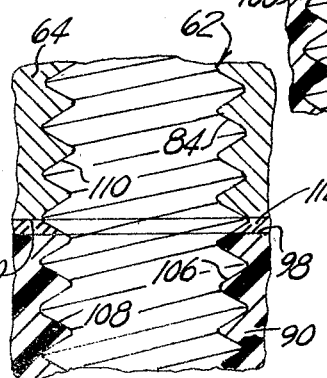

MOUNTING STRUCTURE FOR DIE, PUNCH AND CORE ROD ASSEMBLY FOR COMPACTING POWDER MATERIAL

CROSS-REFERENCE TO RELATED PATENTS AND PATENT APPLICATIONS

The present application is a continuation-in-part of application Ser. No. 351,482 filed Feb. 23, 1982, now U.S. Pat. No. 4,390,335, issued June 28, 1983 and assigned to the same assignee. The present application is on an improvement on the punch and die assemblies for compacting powder material disclosed and claimed in U.S. Pat. Nos. 3,328,840, 3,414,940, 3,561,056, 3,574,892, 3,621,534, 3,640,654, 3,669,582, 3,671,157, 3,775,032, 3,805,370, 3,822,974, 4,053,267 and 4,153,399, all assigned to the same assignee as the present application.

BACKGROUND OF THE INVENTION

The present invention relates to powder material compacting presses, more particularly to an improved die, punch and core rod assembly for powder compacting presses.

In powder compacting presses as disclosed in U.S. Pat. Nos. 3,328,840, 3,344,213, 3,328,842, 3,414,940, 3,561,054, 3,726,622, 3,741,697, 3,775,032, 3,805,370 and 3,822,974, all assigned to the same assignee as the present application, there are disclosed apparatus such as presses and tools for such presses for compacting powder material, such as powdered metal, ferrite, glass and other materials into diverse articles such as toroids, beads, pellets and the like. In the powder compacting apparatus disclosed in the aforementioned patents, the articles are formed in single or multi-cavity dies, in which reciprocable punches are disposed, by compaction of the powder material between the punch end face and an anvil displaceable over the die cavity so as to overlap the die cavity.

A work station positioner assembly, forming part of the press apparatus, is disposed angularly or linearly movable over the die plate and is provided with three separate or integral elements, a powder dispenser unit, an anvil, and a pick-up head. The powder dispenser unit is first positioned over the die cavity to fill the die cavity with a predetermined amount of powder material. The dispenser unit is then removed from above the work station positioner assembly, and the anvil unit is in turn positioned over the die cavity and clamped in position. The punch is reciprocated upwardly in the die such as to compact the powder material between the punch end face and the anvil. The anvil is then unclamped from above the die cavity and replaced by the pick-up head as a result of further angular or linear motion of the work station positioner assembly. The punch is reciprocated upwardly so as to eject the compacted article from the die cavity into the pick-up head for transfer to a remote station, or, alternatively, for transfer to a collection station by subsequent motion of the work station positioner assembly.

By way of utilizing standardized punch and die assemblies in the form of interchangeable tool capsules, all adapted to be interchangeably mounted on the press table in an appropriate mounting aperture and held therein by any convenient means such as by mounting bolts or clamps, the remaining of the tool capsule projecting below the press table, with the punch actuating mechanism of the press appropriately connected to the punch actuating plate portion of the tool capsule, it is a simple matter after a production run of a particular part to remove a tool capsule and replace it by another tool capsule for compacting a different part. With the exception of the die, the punches, and the core rods, if any, all the other mechanical parts forming the tool capsule are subject to little or no wear. The die, the punch and the core rods, if any, are however subject to important load stresses and to wear, as a result of which they may experience dimensional changes, such as a progressive opening of tolerances, and, if subjected to abnormal loads, they may be damaged beyond repair or even break. It is therefore convenient for the user to provide a tool capsule which can be easily dismantled and which provides easy removal of the die plate or of the die bushings, the punches and the core rods, when they become worn or when they break, for replacement by new die plate or die bushings, punches and core rods. It is also desirable that replacement punches and core rods be reinserted in the tool capsule without too much fuss, and without requiring complicated fixtures and gauges. In tool capsules comprising slender core rods for forming apertures in the compacted article it is also desirable that the core rods be easily replaced, and be adjustable in longitudinal position either individually, or as a group, or both, and, where a plurality of cores are used, that each individual core rod be replaceable without disturbing the position of the others.

The invention disclosed in prior application Ser. No. 351,482 relates to a die, punch and core rod assembly, or tool capsule, for powder material compacting presses, provided with a stationary non-adjustable or adjustable core rod mounting plate supporting one or more stationary core rods, permitting removal and replacement of core rods without requiring the tool capsule to be removed from the press and/or dismantled, and allowing the longitudinal position of the individual core rods to be adjustably pre-set or, in the alternative and in addition, permitting the core rod support to be adjustably pre-set in a longitudinal position.

SUMMARY OF THE INVENTION

The principle object of the present invention is to provide a simple structure for adjustably mounting core rods in a core rod mounting plate supporting one or more stationary core rods, permitting each core rod, once adjusted longitudinally relative to the core rod support plate, to be safely locked in its adjusted stationary position.

A better understanding of the present invention will be obtained by those skilled in the art when the following description of the best modes contemplated for practicing the invention is read in conjunction with the accompanying drawings wherein like numerals refer to like or similar parts and in which:

BRIEF DESCRIPTION OF THE DRAWINGS

FIG. 1 is a top plan view of a die, punch and core rod assembly, or tool capsule, according to the present invention;

FIG. 2 is a section along line 2—2 of FIG. 1;

FIG. 2a is a view of a portion of FIG. 2 at an enlarged scale;

FIG. 3 is a partial section along line 3—3 of FIG. 1;

FIG. 4 is a view similar to FIG. 3, but showing the punch element in a retracted position relative to the die element;

FIG. 5 is a view similar to FIG. 3 but showing a modification thereof; and

FIGS. 6-8 are enlarged schematic views of portions of a core rod support plate useful in explaining the principle of structure and operation of the present invention.

DETAILED DESCRIPTION OF THE PREFERRED EMBODIMENT

Referring to the drawings, and more particularly to FIGS. 1-4 thereof, a die, punch and core rod assembly 10, or tool capsule, according to the present invention comprises a die plate 12 adapted for mounting in an opening 14 in the table 16 of a powder compacting apparatus, or press (not shown). The die plate 12 is mounted by means of countersunk screws 18, FIG. 1, on a spacer plate 20 in turn directly bolted or clamped, in a manner not shown, on the top of the table 16 over the opening 14. A pair of parallel spaced apart guide posts 22, mounted below the spacer plate 20, slidably support and guide a punch support plate 24 and a punch actuating platen 26 disposed parallel to each other and in spaced-apart relationship. The punch actuating platen 26 is mechanically connected to the press lower ram, not shown, for reciprocation therewith, and is rigidly connected to the punch support plate 24 by means of spacers such as tubular spacers 28, only one of which is shown, and bolts 30.

The die plate 12, made of heat-treated tool steel or of a metallic carbide, for example, has a die opening or cavity 32 in which is reciprocably disposed a punch 34 which may be made of solid construction but which, preferably, has a top block or insert 36 made of extra hard material such as a metal carbide or the like, and a body portion 35. If so desired, the die plate 12 instead of being directly provided with a die opening 32 may be provided with a fitted die bushing of extra hard material such as a carbide, in turn provided with the die opening or cavity 32.

The punch 34, which, in the example of structure illustrated, has a substantially square or rectangular body portion 35 and insert 36, is formed integral with a circular plate 38 bolted on the top of a generally cylindrical tubular punch base 40 by way of socket head bolts 42. The bottom of the punch base 40 is disposed in a stepped bore 44 in the punch support plate 24 and is solidly attached to the punch support plate 24 by means of a shouldered spacer bushing 46 having a central bore 48 through which is passed the body of a bolt 50 threading through a centrally disposed threaded bore 52 in the bottom of the cylindrical punch base 40. The die plate 12 has a cylindrical recess 54 formed on its lower surface to provide clearance around the punch circular plate 38, and the spacer plate 20 has an opening 56 providing passage therethrough of the punch base 40.

The punch 34 has a plurality of longitudinally disposed small bores 58 through each of which is passed a core rod 60. In the example of structure illustrated, the reciprocable punch 34 is designed to compact in the die opening or cavity 32, against the face of an anvil 59, FIG. 4, a substantially square or rectangular part of powder material, the part being provided with apertures, each one corresponding to one of the core rods 60, as is well known in the art. The punch 34 is reciprocated downwardly to a position, for example, as shown at FIG. 4, the tip of the core rods 60 being evenly flush with the top surface of the die plate 12. The die opening or cavity 32 above the retracted punch is filled with powder material from a powder dispenser, not shown, and the anvil 59 is displaced to straddle over the die opening or cavity 32 and clamped in position. The punch 34 is reciprocated towards the anvil 59 such as to compact the powder material in the die opening or cavity 32 against the face of the anvil. Subsequently, the anvil 59 is displaced away from over the die opening or cavity 32, and the compacted part is ejected from the die opening or cavity 32. At FIGS. 2 and 3 of the drawings the punch 34 is illustrated in a position corresponding to ejection of the compacted part from the die opening 32, and at FIG. 4 the punch 34 is illustrated in the approximate position it occupies during filling of the die opening or cavity 32 with powder material, prior to compacting the part, not shown. The core rods 60 are at all times held stationary during reciprocaton of the punch 34.

The core rods 60 are supported by a block 62. The block 62 is freely disposed within a recess 66 in the punch base 40, below the punch support plate 38. The core rods 60 are each disposed through one of the bores 68, FIGS. 2, 3 and 4, in the integral punch plate 38 and punch body 35. The core rod support block 62 has a pair of diametrally opposed arms 70, FIGS. 3-4, laterally projecting through longitudinal slots 72 formed in the wall of the tubular punch base 40, and the core rod support block 62 is mounted, bridge-like fashion, below the die plate 12 by means of a pair of bolts 74 each passed through a vertically disposed bore 76 proximate the end of each arm 70 and through the interior of a tubular spacer 78, the end of each bolt 74 threading through an appropriate threaded bore 80 in the die plate 12. In this manner, when the punch support plate 24, supporting the punch base 40 on the top of which the punch 34 is mounted, is reciprocated the core rod support block 62 remains stationary.

As shown at FIG. 2 and in detail at FIG. 2a, each core rod 60 is mounted longitudinally adjustable relative to the core rod support block 62 by being fastened in a threaded foot member 82 in turn threaded in a threaded bore 84 in the core rod support plate 64. The threaded foot member 82 is preferably in the form of an elongate set screw, having an axially disposed bore 86 in which is press-fitted, cemented, brazed or otherwise fastened the end of the core rod 60. By introducing the end of a driving tool, such as a hexagonal tip wrench, in the hexagonal socket 88 at the end of the set screw-like member 82, each core rod 60 may be adjustably positioned relative to its support block 62 such that the tips of all the core rods 60 are disposed at an even level which correspond, for anvil pressing, to the top edge of the die opening 32, FIG. 4.

At FIG. 5 there is illustrated a structure for a die, punch and core rod assembly 10 substantially similar to the structure of FIGS. 1-4, but wherein the core rod support block 62 is adjustably mounted below the die plate 12, such as to provide longitudinal positioning of the core rods 60 as a group. For that purpose, each arm 70 of the core rod support block 62, projecting from the punch base 40 through the slots 72, has a threaded bore 103 in which is disposed the peripherally threaded portion 105 of a spacer sleeve 107. The spacer sleeve 107 has a plurality of radial bores 109 permitting to rotate the spacer sleeve 107 by means of a tool in the form of a rod introduced through a radial bore 109, such that each of the spacer sleeves 107 may be extended from the top of the arm 70 of the core rod support plate or block 62 to space the core rod support block 62 from the die plate 12, with the end face 111 of each spacer sleeve 107 engaging the bottom surface of the die plate 12. A pair of mounting bolts or hexagonal socket head screws 113, each passed through the internal bore 120 of a spacer sleeve 107 and threading through an appropriate threaded bore 122 in the bottom of the die plate 12, securely affix the core rod support block 62 an appropriate distance below the die plate 12, such that the tips of all the core rods 60 are fixedly disposed where required in the die opening or cavity 32, for example even with the edge of the die cavity. As the longitudinal position of each core rod 60 is individually adjustable relative to the core rod support block 62 such a structure provides for both individual adjustment and for adjustment of the position of the support block 62 relatve to the die plate 12.

Once a correct longitudinal position of each core rod 60 has been achieved, the core rod is securely held in its adjusted longitudinal position as a result of the specific structure provided for the core rod support block 62. In the structure illustrated, and as best shown at FIG. 2a, the core rod support block 62 comprises a main body portion which is in the form of a metallic plate 64 such as a steel plate, and which is provided with a threaded bore 84 for each of the core rods 60. An adjoining plate 90 made of sturdy impact-resistant, but slightly resilient, plastic, such as polyamide, polypropylene, and the like, a preferred material being an acetal resin sold by E. I. DuPont de Nemours & Co. under the trademark Delrin, is mounted below and in engagement with the rod support plate 64. The plastic plate 90 is attached to the core rod metallic support plate 64 by means of mounting screw 92, a retaining or pressure plate 94 being interposed between the bottom face of the heads of the screws 92 and the lower surface 96 of the plastic plate 90. The upper surface 98 of the plastic plate 90 and the lower surface 100 of the metallic plate 64 are thus caused to be engaged with each other along a plane 102 of engagement. The retaining plate 94 is provided with an opening 104, and the plastic plate 90 is provided with a threaded bore 106 aligned with the opening 104 and also aligned with the threaded bore 84 in the metallic plate 64. The threaded foot member 82, which is provided with the longitudinal bore 86 in which is mounted the end of the core rod 60, threads in both aligned threaded bore 106 in the plastic plate 90 and threaded bore 84 in the metallic plate 64. The screwthreads 108 and 110 of respectively the threaded bore 106 in the plastic plate 90 and the threaded bore 84 in the metallic plate 64, are identical as to shape, number of threads per inch, pitch, outside diameter, pitch diameter and minor diameter. The aligned threaded bores 84 in the steel plate 64 and 106 in the plastic plate 90 are obtained by the following steps:

The three plates 64, 90 and 94 are assembled together by means of the bolts 92. The sandwich of plates 64, 90 and 94 is drilled in the appropriate locations for the core rods in a single drilling operation for each location. The bore drilled in the retaining plate 94 is enlarged to the size of the bore 104 providing appropriate clearance for the outer diameter of the core rod threaded member 82. The screwthreads 108 and 110 are cut simultaneously to form the threaded bores 84 and 106 in, respectively, the steel plate 64 and the plastic plate 90, such as to obtain a continuous screwthread as schematically illustrated at FIG. 6. Subsequently, and after disassembling the three plates 64, 90 and 94, the lower face 100 of the steel plate 64 is ground such as to remove from the surface a depth of metal in the range of 0.001 to 0.006 in. (0.025 to 0.15 mm), with the result that when the three plates 64, 90 and 94 are re-assembled, the pitch of the common screwthread 110-108, forming the threaded bores 84 in the steel plate 64 and 106 in the plastic plate 90, is shortened by the depth of metal removed from the surface 100 of the steel plate 64 at the plane of junction 102 between the surface 100 of the steel plate and the surface 98 of the plastic plate, as illustrated at FIG. 7. Consequently, when the threaded member 82 is threaded through the aligned threaded bores 106 in the plastic plate 90 and 84 in the steel plate 64, the mismatch between the screwthreads 108 and 110, due to the shortening of the pitch at the junction plane 102, causes an elastic deformation of the screwthread 108 in the plastic plate 90 that actually causes the threaded member 82 to be frictionally held at the appropriate setting, resulting in the core rod 60 being immobilized longitudinally in its preset position. The frictional engagement between the deformed screwthread 108 in the plastic plate 90 and the peripheral thread of the threaded member 82 creates a strong opposing torque to the threading of the threaded member 82 in the threaded bore 84 of the steel plate 64, which can be relieved during longitudinal adjustment of the core rod 60 by decreasing the pressure applied by the pressure plate 94 upon the plastic plate 90 by slightly loosening the bolts 92. Once the appropriate precise longitudinal position of the core rod 60 is achieved, the bolts 92 are tightened. When it is desired to replace core rods, the bolts 92 are loosened prior to removing the core rods by unscrewing the threaded member 82, and the bolts 92 are tightened again after the replacement core rods have been installed and accurately longitudinally positioned.

As an example of numerical values, given for illustrative purpose only, a plate 90 of Delrin, about 0.1 in. (2.5 mm) thick, sandwiched between a steel mounting plate 64 and a retaining pressure plate 94, both the plastic plate 90 and the steel plate 64 being threaded to accept a No. 3 fine thread set screw of commercial quality forming the threaded member 82 supporting a core rod 60 has been used with success for immobilizing the set screw after removing about 0.005 to 0.006 in. (0.127 to 0.15 mm) from the surface 100 of the steel plate 64. With precision set screws used as the core rod threaded support member 82, only approximately 0.001 to 0.002 in. (0.025 to 0.05 mm) need be removed from the surface 100 of the steel plate 64.

It will be appreciated by those skilled in the art that means other than grinding the face 100 of the core rod support plate 64 may be used for providing the mismatch between the screwthread 110 of the threaded bore 84 in the steel plate 64 and the screwthread 108 of the threaded bore 106 in the plastic plate 90 such as, for example, placing a shim sheet 112, FIG. 8, of an appropriate thickness between the face 100 of the metallic plate 64 and the face 98 of the plastic plate 90, when the elements forming the core rod support block 62 are momentarily assembled prior to drilling and tapping the core rod mounting threaded bores 84 and 106. After removing the shim sheet 112 and reassembling the mounting steel plate 64 and the mounting plastic plate 90 by means of the retainer plate 94 and the bolts 92, the appropriate mismatch between the screwthreads 108 and 110 is effected at the plane 102 of junction of the surfaces 98 and 100 of the plastic plate 90 and steel plate 64, respectively.

Having thus described the present invention by way of an example of structural embodiment thereof, modification whereof will be apparent to those skilled in the art, what is claimed as new is as follows:

1. In a punch and die assembly for a powder compacting press comprising a die plate, at least one punch reciprocable relative to said die plate and at least one core rod stationary relative to said die plate, said core rod having an end slidably disposed in a bore through said punch, a punch base member connected to a reciprocable platen supporting said punch, a core rod support member disposed in a recess within said punch base member and having integral support arms projecting through slots in said punch base member, means for attaching the end of said arms below said die plate and means mounting the other end of said core rod in said core rod support member and providing longitudinal adjustment of said core rod relative to said core rod support member, the improvement comprising a threaded member fastened at said other end of said core rod, said core rod support member having a core rod mounting plate, a core rod locking plate and a retainer plate applying said locking plate in engagement with said mounting plate, a threaded bore in said mounting plate accepting said threaded member, and a threaded bore in said locking plate aligned with said threaded bore in said mounting plate, wherein a slight thread mismatch is provided between said first and second threaded bores.

2. The improvement of claim 1 wherein said threaded member is an elongate set screw having a longitudinal bore in which is fitted the other end of said core rod.

3. The improvement of claim 1 wherein said locking plate is made of plastic.

4. The improvement of claim 1 wherein said thread mismatch is a mismatch in thread pitch.

5. The improvement of claim 1 wherein said core rod mounting plate is mounted below said die plate adjustable in position towards said die plate and away therefrom.

6. The improvement of claim 5 wherein said means for adjustably mounting said core rod mounting plate below said die plate comprises a variable length spacer.

7. The improvement of claim 6 wherein said variable length spacer comprises a sleeve member having a peripherally threaded portion, a threaded bore in each of said arms accepting the peripherally threaded portion of said sleeve, and a bolt passed through said sleeve member and threading at its end in a threaded aperture in said die plate.

8. In a punch and die assembly for a powder compacting press, said assembly comprising a die plate, at least one punch reciprocable relative to said die plate and at least one core rod stationary relative to said die plate, said core rod having an end slidably disposed in a bore through said punch, means reciprocably supporting said punch relative to said die plate, and means supporting said core rod at the other end in a stationary adjustable position relative to said die plate, said last mentioned means comprising a core rod support member disposed below said punch, means attaching an end of said core rod to said support member and means attaching said support member to said die plate, wherein said core rod is attached to said core rod support member by means providing longitudinal adjustment of said core rod, the improvement comprising said support member comprising a core rod mounting plate, a core rod locking plate and a retainer plate applying said locking plate in engagement with said mounting plate, aligned threaded bores in said mounting and locking plates, wherein a slight thread mismatch is provided between said threaded bores, and a threaded member fastened at said other end of said core rod in threaded engagement partly in each of said threaded bores.

9. The improvement of claim 8 wherein said threaded member is an elongate set screw having a longitudinal bore in which is fitted said other end of said core rod.

10. The improvement of claim 8 wherein said locking plate is made of plastic.

11. The improvement of claim 8 wherein said thread mismatch is a mismatch in thread pitch.

12. The improvement of claim 8 wherein said core rod support member is attached to said die plate by means providing adjustment of said support plate toward and away from said die plate.

13. The improvement of claim 12 wherein said means for adjustably mounting said core rod support member below said die plate comprises a variable length spacer.

14. The improvement of claim 13 wherein said variable length spacer comprises a sleeve member having a peripherally threaded portion, a threaded bore in each of said arms accepting the peripherally threaded portion of said sleeve, and a bolt passed through said sleeve member and threading at its end in a threaded aperture in said die plate.

* * * * *